(12) United States Patent
Hewavithana et al.

(10) Patent No.: US 11,838,070 B2
(45) Date of Patent: Dec. 5, 2023

(54) AMPLIFICATION APPARATUS, DEVICE, AND METHOD FOR A TAP OF A CABLE COMMUNICATION NETWORK

(71) Applicant: Intel Corporation, Santa Clara, CA (US)

(72) Inventors: Thushara Hewavithana, Chandler, AZ (US); Nathan Goichberg, Ashdod (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/905,264

(22) PCT Filed: Mar. 30, 2020

(86) PCT No.: PCT/US2020/025633
§ 371 (c)(1),
(2) Date: Aug. 30, 2022

(87) PCT Pub. No.: WO2021/201817
PCT Pub. Date: Oct. 7, 2021

(65) Prior Publication Data
US 2023/0144817 A1    May 11, 2023

(51) Int. Cl.
*H04B 3/38* (2006.01)
(52) U.S. Cl.
CPC ...................................... *H04B 3/38* (2013.01)
(58) Field of Classification Search
CPC ........................................................ H04B 3/38
See application file for complete search history.

(56) References Cited

U.S. PATENT DOCUMENTS

| | | | | |
|---|---|---|---|---|
| 5,148,117 A | * | 9/1992 | Talwar | ................... H03F 1/3229 |
| | | | | 330/149 |
| 6,467,969 B1 | * | 10/2002 | Shmulovich | ......... G02B 6/4249 |
| | | | | 385/54 |

(Continued)

OTHER PUBLICATIONS

John T Chapman et al., 'Blueprint for 3 GHZ, 25 Gbps DOCSIS; Getting 25 GB ps PON-Like Performance Out of HFC', SCTE-ISBE, Cable-Tec, 2019 Expo, Oct. 3, 2019 [retrieved on Nov. 20, 2020]. Retrieved from Internet: <https://www.qorvo.com/resources/d/qorvo-blueprint-for-3-ghz-25-gbps-docsis-scte-2019> pp. 1-51 and figures 5, 11, 20.

(Continued)

*Primary Examiner* — Dominic E Rego
(74) *Attorney, Agent, or Firm* — SPL Patent Attorneys PartG mbB; Yong Beom Hwang

(57) ABSTRACT

Examples relate to an amplification apparatus, device or method, to a Tap for a cable communication network comprising an amplification apparatus or device, and to a cable communication network comprising an amplification apparatus or device. The amplification apparatus comprises interface circuitry for exchanging a first version of a shared signal with a first component of the cable communication network. The shared signal is based on a frequency spectrum comprising at least a first frequency band and a second frequency band. The amplification apparatus comprises interface circuitry for exchanging a second version of the shared signal with a second component of the cable communication network. The amplification apparatus comprises amplifier circuitry configured to selectively amplify the first frequency band of the frequency spectrum of the shared signal, such that the first frequency band is amplified in the second version of the shared signal.

21 Claims, 6 Drawing Sheets

(56) References Cited

U.S. PATENT DOCUMENTS

| | | | |
|---|---|---|---|
| 10,966,213 B1* | 3/2021 | Ozozlu | H04L 5/0082 |
| 2005/0034167 A1 | 2/2005 | Weinstein et al. | |
| 2007/0061854 A1 | 3/2007 | Albag et al. | |
| 2007/0218852 A1* | 9/2007 | Huynh | H04B 1/54 455/217 |
| 2007/0261094 A1* | 11/2007 | Urbanek | H04N 21/6168 725/127 |
| 2010/0124183 A1* | 5/2010 | Sorond | H04J 3/22 370/280 |
| 2011/0136497 A1* | 6/2011 | Youtz | H04B 1/1027 455/452.2 |
| 2012/0306716 A1* | 12/2012 | Satake | H04B 1/44 343/876 |
| 2013/0300412 A1* | 11/2013 | Apostolos | G01R 33/36 324/309 |
| 2015/0326378 A1* | 11/2015 | Zhang | H04W 72/0453 370/280 |
| 2017/0054423 A1* | 2/2017 | Ariesen | H04N 7/102 |
| 2018/0100875 A1* | 4/2018 | Moheimani | G05D 3/1454 |
| 2021/0149018 A1* | 5/2021 | Elad | G01S 7/35 |

OTHER PUBLICATIONS

Werner Coomans et al., 'Full Duplex DOCSIS over Active (N+X) Cable Networks', SCTE-ISBE, Cable-Tec, 2019 Expo, Oct. 3, 2019 [retrieved on Nov. 20, 2020]. Retrieved from Internet: <https://www.nctatechnicalpapers.com/Paper/2019/2019-full-duplex-docsis-over-active-n-x-cable-networks/download> pp. 1-23 and figure 1.

Frank O'Keeffe et al., 'Full Duplex DOCSIS & Extended Spectrum DOCSIS hold hands to form the 10G cableE network of the future', IBC, Oct. 17, 2019 [retrieved on Nov. 20, 2020]. Retrieved from Internet: <https://www.ibc.org/full-duplex-docsis-and-extended-spectrum-docsis-hold-hands-to-form-the-10g-cable-network-of-the-future/5038.article> pp. 1-10 and figures 1-2.

* cited by examiner

US 11,838,070 B2

AMPLIFICATION APPARATUS, DEVICE, AND METHOD FOR A TAP OF A CABLE COMMUNICATION NETWORK

FIELD

Examples relate to an amplification apparatus, device or method, to a Tap for a cable communication network comprising an amplification apparatus or device, and to a cable communication network comprising an amplification apparatus or device.

BACKGROUND

DOCSIS 4.0 (Data Over Cable Service Interface Specification 4.0) has been developed as an industry standard to enable 10 Gbps downstream and 5 Gbps upstream capacity using 1.2 GHz of Cable spectrum with full duplex (FDX) or 1.8 GHz spectrum without FDX. This may be sufficient for cable operators to meet service demands for the next 10 years based on current compound annual growth rate (CAGR) of peak service rate.

Looking beyond the 10-year time frame, cable operators may desire capacities in the range of 25 Gbps in downstream to be competitive with other access technologies like PON (Passive Optical Network) in meeting ever increasing consumer data rates.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
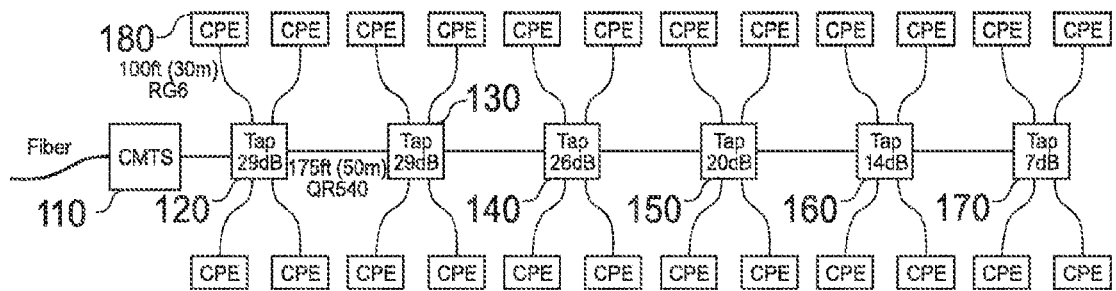
FIG. 1 shows a schematic diagram of a portion of a cable communication network.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Various examples of the present disclosure provide an extended spectrum amplifier for backward compatible HFC (hybrid fiber coax) network upgrade to use a multi GHz Coax (coaxial) spectrum. As has been pointed out before, cable operators may desire capacities in the range of 25 Gbps in downstream to be competitive with other access technologies. For example, this may be achieved in a Cable network by extending the spectrum used to 3 GHz or more.

To extend DOCSIS beyond 1.2 GHz, the whole eco system may be upgraded:
1. Node may be upgraded to process signals for the extended spectrum
2. Cable Modem (CM) may be upgraded to process the extended spectrum
3. Network may be upgraded to propagate the extended spectrum The focus of the present disclosure may be on the 3$^{rd}$ point above.

The cable propagation channel may comprise both active and passive elements—Hard line trunk cables are used from the Node to the tap and between taps, lower quality (e.g. RG6, a common type of coaxial cable) cables are used as drop cables from a Tap to a Home. The Taps themselves may be designed to support a certain spectrum. In an active node (N+X, where X>0 denotes the maximum number of amplifiers between the Node and a CM in the network), there may also be amplifiers in the network, to amplify the signal as it attenuates going through the cable channel.

Various examples of the present disclosure may focus on a passive Node (N+0, where 0 means no amplifiers after the Node) scenario as shown in FIG. 1. FIG. 1 shows a N+0 Network Example. FIG. 1 shows a schematic diagram of a portion of a cable communication network. The cable communication network comprises a Cable Modem Termination System (CMTS) 110, which is connected via Fiber, and a plurality of taps 120-170, which are sequentially connected to the CMTS. Each Tap is further connected to a plurality of cable modems 180 (denoted CPE, Customer Premises Equipment, CPE in FIG. 1). In the example of FIG. 1, the CPEs are connected to the respective Tap via (up to) a 100 ft/30 m RG6 cable. The coaxial cable between two Taps is up to 175 ft/50 m long, and of type QR540 (another type of coaxial cable). The Tap value (which refers to the signal attenuation from input Tap port to Tap out ports) decreases from Tap to Tap, starting from 29 dB at the first Tap and going down to 7 dB at the last Tap. In FIG. 1, each Tap has 4 Tap out ports. Signal power at these Tap out ports are lower by the Tap value compared to the Tap input signal level.

Here, the CMTS may be an integrated CMTS (traditional model) or a PHY (Physical) layer of a distributed CMTS architecture, referred to as remote PHY (RPHY). Consumer Premises Equipment (CPE) in this case is a CM.

An N+0 architecture is a pre-requisite for implementing 1.2 GHz DOCSIS FDX, whereas 1.8 GHz DOCSIS 4.0 can work in N+X networks as well. Examples provided in the present disclosure may be applicable to both N+0 and N+X networks, FDX or non-FDX.

Current amplifier spacing in the Cable network is designed to support a spectrum up to a certain frequency (e.g. 1.2 GHz). In order to upgrade the network to support frequencies beyond that (e.g. 3 GHz), operators may upgrade both active and passive elements, such as Taps, Connectors, etc., in the network. However, it is assumed that the Cables, both Trunk and Drop, remain as is. This is because replacing cables may be very costly and a labor-intensive task, which has prevented operators from trying to go all the way to fiber (Fiber to the home—FTTH) in the first place.

Various examples of the present disclosure relate to an approach for increasing the capacity of the extended spectrum network with minimal change to the infrastructure. Specifically, the increased loss of capacity for CMs connected to "far away" Taps in N+0 network may be addressed.

To extend the Cable spectrum beyond 1.2 GHz, the Taps may be upgraded (or selective amplifiers may be slotted in between Taps), and potentially some of the connectors in the network may be upgraded. However, the Cables in the network may remain unchanged. This may avoid the costly and tedious process of having the dig out and replace the cables.

Figure 2:
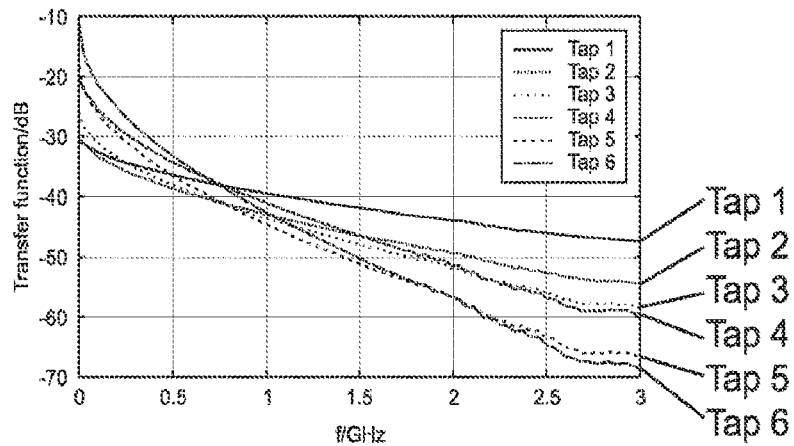
FIG. 2 shows a graph showing the transfer function of a signal provided to a plurality of Taps.

One of the key properties of Coax cables is that their signal attenuation increases monotonically with frequency. FIG. 2 shows loss in cable channel from the Node to the CMs connected to different Taps for the network shown in FIG. 1. FIG. 2 shows a graph showing the transfer function of a signal provided to a plurality of Taps, as experienced by Taps 1 to 6 (i.e. 120-170) of FIG. 1. FIG. 2 may thus show a loss of an N+0 network. As can be seen form FIG. 2, above 1 GHz, the loss is substantially more pronounced for the Taps that are further away from the CMTS (Tap 6 being the Tap that is furthest away).

In current networks, the transmit power of the Node may be enough to deal with the level of attenuation for the spectrum below 1.2 GHz. However, the losses and resultant capacity loss becomes significant when higher frequencies are reached. Hence, either the transmit signal power may be increased, or additional amplification stations may be to be added to cable network. Transmit power is limited by the amplifier technology and network power budget. Hence additional amplifier stations may provide the more practical solution.

As the cable industry has thus far only used the spectrum below 1 GHz, there might not be previous approaches for such an amplification. The network has been originally designed with amplifier spacing that is sufficient to support signals below ~1 GHz. Following how Cable operators previously handled cable attenuation, they may be inclined to change the spacing between the network Amps to tackle this issue. For example, in the N+0 Node network shown in FIG. 3, placing a network Amp after Tap 3 (140) to amplify the signal going beyond that point may address the desire.

Placing an additional Amp in N+0 network makes the Node N+1. This means that FDX may not be implemented in such a scenario. Besides, placing a full-blown network Amp might not be necessary to tackle the issue, as increased signal attenuation might only critically impact the throughput in the extended spectrum. Therefore, examples of the present disclosure focus on boosting the signal power in the extended spectrum. A full-blown Amp covering 1.8 GHz or 3 GHz spectrum may also be more complex and power-hungry compared to the approach presented in the context of the present disclosure.

Figure 3A:
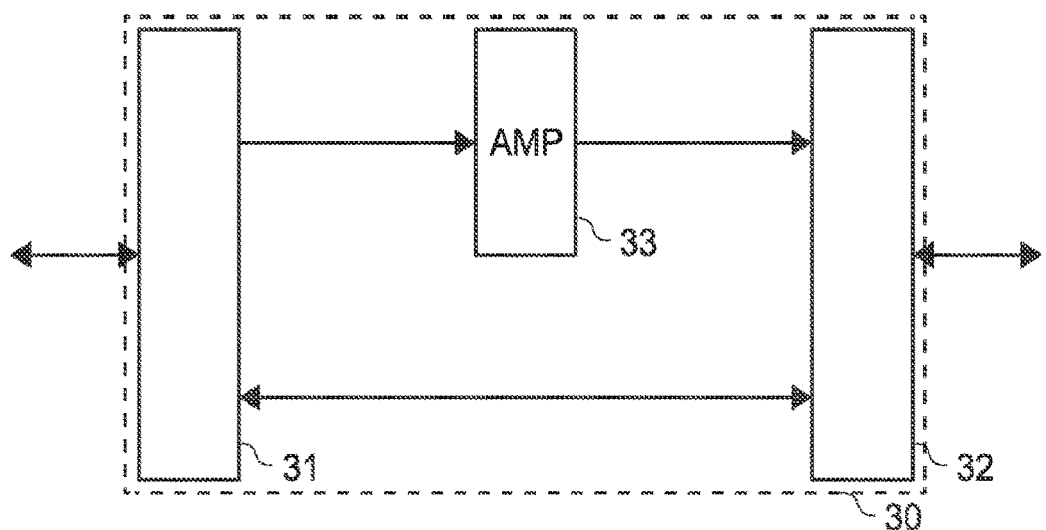
FIGS. 3a and 3b show block diagrams of examples of an amplification apparatus or amplification device for a Tap of a cable communication network.
Figure 3B:
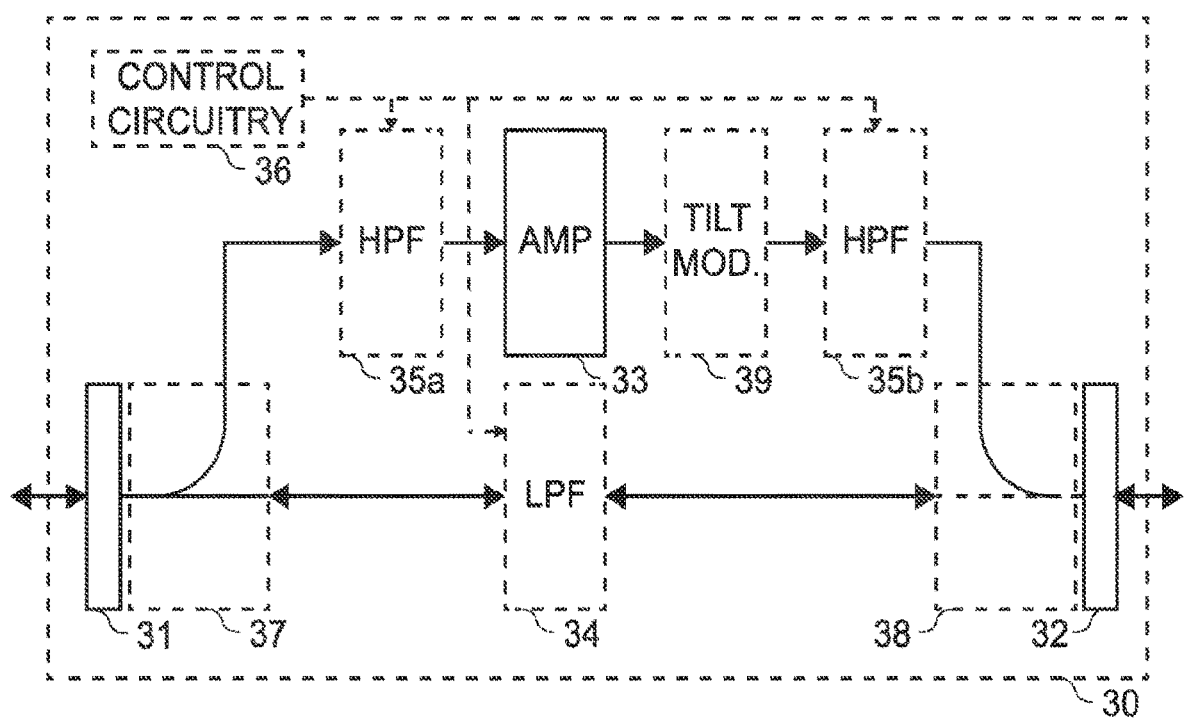

FIGS. 3*a* and 3*b* show block diagrams of examples of an amplification apparatus or amplification device 30 for a Tap 310 of a cable communication network 3000. The components of the amplification device 30 are defined as component means, which correspond to the respective structural components of the amplification apparatus 10. The amplification apparatus/device comprises interface circuitry (i.e. interfacing means) 31 for exchanging a first version of a shared signal with a first component of the cable communication network. The shared signal is based on a frequency spectrum comprising at least a first frequency band and a second frequency band. The amplification apparatus/device comprises interface circuitry (i.e. interfacing means) 32 for exchanging a second version of the shared signal with a second component of the cable communication network. The amplification apparatus/device comprises amplifier circuitry (i.e. means for amplifying) 33 configured to selectively amplify the first frequency band of the frequency spectrum of the shared signal, such that the first frequency band is amplified in the second version of the shared signal.

Various examples of the present disclosure relate to an amplification apparatus or amplification device (in the following only referred to as amplification apparatus) for a cable communication network, e.g. for a Tap of a cable communication network. For example, the amplification apparatus may be suitable to be used on a shared signal being used in the cable communication network. In general, cable communication networks use a shared spectrum of a shared signal, i.e. both the uplink spectrum and the downlink spectrum is shared among a plurality of cable modems. While transmission in the downlink spectrum are transmitted by a single entity, e.g. the DOCSIS Cable Modem Termination System, CMTS (and thus require no additional scheduling), transmissions of the cable modems within the uplink spectrum are scheduled by the scheduler of the cable communication network. The cable modems are assigned so-called slots or mini-slots (i.e. time slots) in the upstream channels of the upstream spectrum, and the cable modems use these slots to transmit their upstream packets on the shared medium.

Transmissions in the downstream spectrum are performed by a central entity (e.g. Node, in the terminology of DOCSIS), which may for example be a CMTS as mentioned before. This central entity transmits within the downstream (or full duplex) spectrum of the shared signal, and the transmissions are received by the cable modems that are connected to the CMTS via Taps of the cable communication network. A Tap is a device (oftentimes a passive device) that is placed in the cable communication network, which often comprises a combination of a directional coupler and splitter to "tap" off some of the shared signal for connection to the cable modems (via drop cables). In cable communication networks, usually, a sequence of Taps is being used (see e.g. FIG. 1), with the Cable Modems being connected to the sequence of taps. As has been laid out before, the downstream signal amplitude that arrives at Taps that are at the end of the sequence of Taps usually is substantially lower than the downstream signal amplitude that arrives at the first Taps. This effect is more pronounced at higher frequency bands, as signal attenuation is higher in the higher frequency bands. Therefore, in examples of the present disclosure, an amplifier may be used to selectively amplify a portion of the spectrum that is subject to increased attenuation.

As has been pointed out before, the shared signal is based on a frequency spectrum comprising at least a first (contiguous) frequency band and a second (contiguous) frequency band. For example, as shown in connection with FIG. 5b, the spectrum being used in a cable communication network may comprise a plurality of portions, which each are used for a specific purpose. For example, the spectrum may comprise a portion (or frequency band) being used for upstream communication, a portion being used for full duplex communication (i.e. both upstream and downstream communication, depending on the scheduling), and a portion being used for downstream communication. In various examples, frequency bands comprising higher frequencies are being used for downstream communication, and frequency bands comprising lower frequencies are being used for upstream or full-duplex communication.

Since higher frequency are subject to more attenuation, the first frequency band (that is amplified by the amplifier circuitry) may comprise higher frequencies than the second frequency band. For example, referring to FIG. 5b, the first frequency band may comprise the extended spectrum being used for downstream communication in the cable communication network (starting above the legacy downstream band). Additionally, the first frequency band may comprise a least portions of the legacy downstream band. For example, the first frequency band may have a lower limit of at least 684 MHz, or at least 700 MHz, at least 800 MHz, at least 900 MHz, or at least 1 GHz. The first frequency band may have an upper limit of up to 1.8 GHz, or of up to 3 GHz. The second frequency band may comprise frequencies being used for upstream transmissions, i.e. upstream spectrum or full duplex-spectrum of the cable communication network. For example, referring to the spectrum introduced in connection with FIG. 5, the second frequency band may have an upper limit that includes the (all of) the upstream and/or full-duplex spectrum, e.g. at least up to 684. In some examples, the second frequency band may reach into the downstream spectrum as well. In other words, the frontier or transition between the first frequency band and the second frequency band may be within the downstream spectrum of the shared signal being used by the cable communication network. More precisely, the first frequency band and the second frequency may be adjacent, e.g. directly adjacent, within the frequency spectrum. The frontier or transition between the first frequency band being adjacent to the second frequency band may be within the downstream spectrum of the shared signal being used by the cable communication network. Accordingly, the first frequency band and at least a portion of the second frequency band being adjacent to the first frequency band may be used for downstream communication within the cable communication network. For example, the second frequency band may comprise several portions, e.g. a portion being used for upstream communication, and a portion being used for full-duplex communication. In some examples, the second frequency band may also comprise a portion that is only being used for downstream communication. In more formal terms, the second frequency band may comprise at least a first portion and a second portion, the first portion being used for downstream communication within the cable communication network and the second portion being used for upstream communication and/or full duplex communication within the cable communication network. The first portion may be (directly) adjacent to the first frequency band. In other words, the first frequency band and the first portion of the second frequency band may form the frequency band being used for (only) downstream communication within the cable communication network.

The amplification apparatus comprises the amplifier circuitry 33 configured to selectively amplify the first frequency band of the frequency spectrum of the shared signal, such that the first frequency band is amplified in the second version of the shared signal. In the context of the present disclosure, the term "selectively amplify" may indicate, that the amplifier circuitry is configured to amplify the first frequency band. For example, the amplifier circuitry may be configured to provide amplification within a frequency band that comprises the first frequency band, and that optionally omits at least portions of the second frequency band. The second frequency band might not be amplified by the amplifier circuitry, or an amplification of the second frequency band performed by the amplifier circuitry might not be fed into the second version of the shared signal.

Therefore, the amplification apparatus may comprise circuitry for creating two paths (i.e. branches)—one path for the first frequency band, and a second path for a second frequency band. In some systems, diplexers might be used to create the two paths, which may lead to a guard band being required between the first and second frequency band that can be used for neither upstream nor downstream communication. Instead, (unidirectional) couplers may be used to branch off a portion of the first version of the shared signal received from the first component, and insert the amplified version of the branched-off portion into the second version of the shared signal.

In general, a coupler (i.e. directional coupler, as implemented by coupling circuitry or coupling means 37; 38 of the amplification apparatus or device 30) may be a passive device that is configured to couple a defined amount of power of a signal to a port, to branch off that amount of power to be used in another circuitry. In general, the entire spectrum of the signal being input to the coupler may be branched off to the port, albeit only the pre-defined amount. Additionally, couplers are direction, so that power only flows into one direction (in this case from a first coupler into the amplifier, and from the amplifier into a second coupler and thus the second version of the shared signal).

In other words, as shown in FIG. 1b, the amplification apparatus may comprise first coupling circuitry (i.e. first coupling means) 37 and second coupling circuitry (i.e. second coupling means) 38. For example, the first and second coupling circuitry may be directional couplers. In other words—a portion of the power of the first version of the shared signal may be branched off by the first coupling circuitry, but the reverse might not be true—the first coupling circuitry might only be configured to branch off a portion (of the power) of the first version of the signal, but not to insert something back into the first version of the shared signal. In other words, first coupling circuitry may be configured to (unidirectionally) provide the first version of the shared signal to the amplifier circuitry. Equally, the second coupling circuitry may be configured to insert the output of the amplifier (after further processing) into the second version of the shared signal, but not the second version of the shared signal into the branch being used by the amplifier. The second coupling circuitry may be configured to (unidirectionally) insert the output of the amplifier circuitry into the second version of the shared signal (e.g. after further processing being performed in the branch). In the context of the present disclosure, the "output of the amplifier (circuitry)" may also relate to processed versions of the signal that is output by the amplifier (circuitry), e.g. a high-pass filtered and/or tilt-corrected/modified version of the signal that is output by the amplifier circuitry.

As has been laid out before, couplers (i.e. coupling circuitry or coupling means) may branch off the entire spectrum. To limit the two branches to the first portion and to the second portion of the spectrum, filters may be used. For example, as further shown in FIG. 1b, the amplification apparatus may comprise a low-pass filter (i.e. low-pass filtering means) 34 and at least one high-pass filter (high-pass filtering means) 35a; 35b. For example, the at least one high-pass filter may be used to isolate the first frequency band for amplification by the amplifier circuitry. Accordingly, the at least one high-pass filter may be configured to at least partially block the second frequency band. For example, the at least one high-pass filter may be configured to attenuate frequencies within the second frequency band more than frequencies of the first frequency band. The low-pass filter may be used to (at least partially) remove or attenuate the first frequency band in a branch or path that bypasses the amplifier circuitry, i.e. to at least partially block the first frequency band. In other words, the at least one high-pass filter may be configured to attenuate frequencies within the first frequency band more than frequencies of the second frequency band. The at least one high-pass filter may be included in the branch being branched off by the first coupling circuitry, and may thus high-pass filter the signal being input and/or being output by the amplifier circuitry. The low-pass filter may be included in a pass-through branch between the first and second coupling circuitry.

In various examples, the amplification circuitry comprises at least one high-pass filter to high-pass filter the input or the output of the amplifier circuitry. For example, the amplification apparatus may comprise a first high-pass filter (i.e. first high-pass filtering means) 35a being configured to high-pass-filter the first version of the shared signal that is provided to the amplifier circuitry by the first coupling circuitry. In other words, the first high-pass filter 35a may be arranged between the first coupling circuitry 37 and the amplifier circuitry. Additionally or alternatively, the amplification apparatus may comprise a second high-pass filter (i.e. second high-pass filtering means) 35b being configured to high-pass-filter the output of the amplifier circuitry (or a tilt-corrected/modified version of the output of the amplifier circuitry, as shown below) and to provide the high-pass filtered output to the second coupling circuitry. In other words, the second high-pass filter 35b may be arranged between the amplifier circuitry 33 and the second coupler circuitry. In some examples, the implementation may include either only one high-pass filter or one before the amplifier and one after, this is a design consideration. The additional filter may increase the slope and reduce the frequency range where signals are close (to reduce multipath) and could be used to reduce the linearity requirements of the amplifier.

As has been pointed out before, the low-pass filter may be included in a pass-through branch between the first and second coupling circuitry. In other words, the first coupling circuitry and the second coupling circuitry may be further configured to exchange a passthrough signal, the passthrough signal bypassing the amplifier circuitry. In contrast to the signal being amplified by the amplifier circuitry, which is a direction signal, the passthrough signal may be bidirectional signal, as it is a branch that is not branched off by the direction coupler, but a branch that passes through the two coupling circuitries. In various embodiments, the passthrough signal may be limited to the second frequency band by the low-pass filter 34. In other words, the amplification apparatus may comprise the low-pass filter 34, which may be configured to low-pass filter the passthrough signal. Depending on the sensitivity to multipath, the low-pass filter in the pass-through might be removed. Using the low-pass filter may reduce the frequency range where the signals are close in power.

Figure 6A:
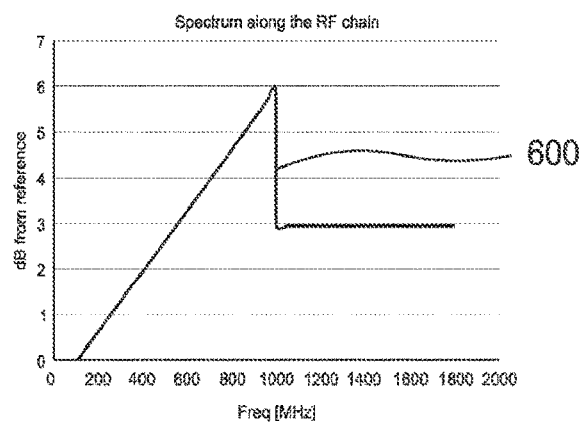
FIG. 6a shows an example of an expected signal Power Spectral Density at the input of an amplifier.
Figure 6B:
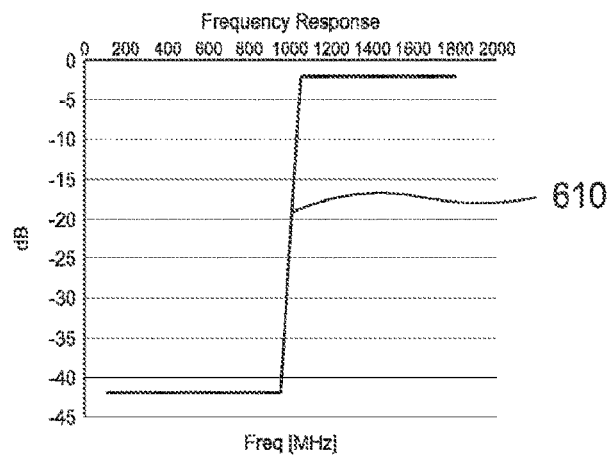
FIG. 6b shows the frequency response of an exemplary implementation of a high-pass filter.
Figure 6C:
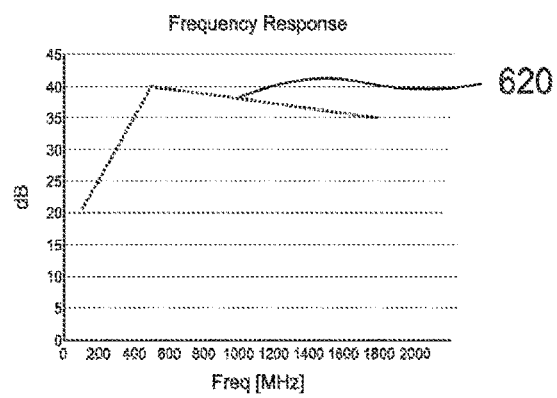
FIG. 6c shows the frequency response of an exemplary implementation of an amplifier.
Figure 6D:
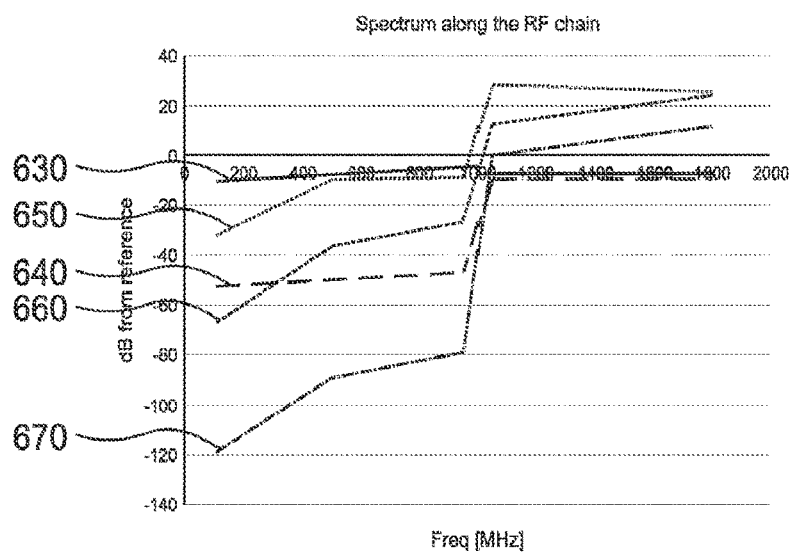
FIG. 6d shows a signal at various points along a high-band path.
Figure 6E:
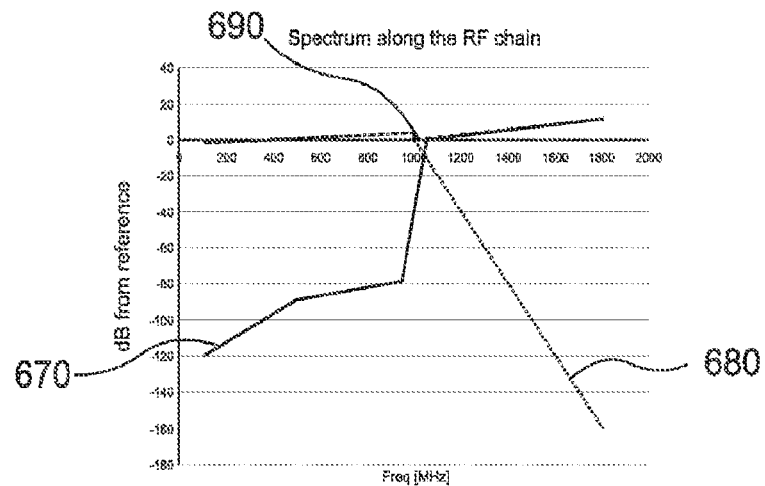
FIG. 6e shows a pass-through low-pass-filtered signal and a high-band amplified and filtered signal.

To provide a smooth transition between the first and second frequency band after the output of the amplifier is inserted by the second coupling circuitry, the filter characteristics of the high-pass and low-pass filters may be chosen such, that they gradually overlap, such that the resulting signal shows an even transition between the bands (e.g. as shown in FIG. 6e). In other words, filter characteristics of the low-pass filter and of the at least one high-pass filter of the amplification apparatus may be chosen such, that, within a transition frequency band partially overlapping the first and the second frequency band, a shift in a frequency response of the low-pass filter occurs in an opposite direction to a shift in a frequency response of the at least one high-pass filter. For example, as shown in FIG. 6e, the passthrough signal 680 and the amplified signal 670 may comprise opposite shifts in the frequency response, which mutually complement each other and result in an even frequency response across the transition between the first and second frequency band.

In the above discussion, it was assumed that the frontier/transition between the first and the second frequency band occurs at a fixed frequency. In some examples, however, the transition may be moved by adjusting the high-pass and low-pass filters. In other words, the transition between the first and second frequency band may be adjustable. For example the low-pass filter may be an adjustable or switchable low-pass filter and the at least one high-pass filter may be at least one adjustable or switchable high-pass filter. In an adjustable high-pass or low-pass filter, the cut-off point of the high-pass or low-pass filter may be gradually moved according to a control signal by a control circuitry. In a switchable high-pass or low-pass filter, a control signal by a control circuitry may be used to switch between different pre-defined filter configurations, e.g. between different pre-defined cut-off points. The amplification apparatus may comprise control circuitry 36 for controlling the frequency separating the first and second frequency band. In other words, the amplification apparatus may comprise control circuitry (i.e. means for controlling) 36, configured to adjust the filter characteristics of the low-pass filter and of the at least one high-pass filter (e.g. by providing the control signal to the respective adjustable or switchable filters), thereby shifting the boundary between the first and the second frequency band.

As has been pointed out before, the signal being output by the amplifier circuitry may be tilt-corrected (i.e. modified), e.g. so that higher frequencies are amplified to a higher degree than lower frequencies within the first frequency band. In other words, the amplification apparatus may comprise amplitude tilt modification circuitry (amplitude tilt modification means) 39 configured to selectively adjust an amplitude of the output of the amplifier circuitry across at least the first frequency band. For example, the amplitude tilt modification circuitry may be configured to apply a higher gain to higher frequencies of the first frequency band, and a lower gain to lower frequencies of the first frequency bands. In various examples, the amplitude tilt modification circuitry may be implemented by amplifier circuitry having an amplifier gain shape that is tilted towards higher frequencies, i.e. resulting in a gain that is higher at higher frequencies. For example, the tilt correction spec may be reduced to traded off with other parameters such as insertion loss.

The amplification apparatus comprises interface circuitry or interfacing means 31 for exchanging a first version of a shared signal with a first component of the cable communication network, and for exchanging a second version of the shared signal with a second component of the cable communication network. For example, the interface circuitry or interfacing means 31; 32 may correspond to one or more signal inputs and/or outputs for receiving and/or transmitting a signal. For example, the interface circuitry or interfacing means 31; 32 may be passive circuitry configured to provide a transition (or port) for a shared signal that is provided via a cable of the cable communication network.

In general, the first component may be located upstream and the second component may be located downstream from the amplification apparatus. Accordingly, the first version of the shared signal may be exchanged with (i.e. received from and transmitted to) a component of the cable communication network that is located closer to the node/CMTS of the cable communication network than the amplification apparatus, e.g. the CMTS or a Tap being located closer to the CMTS than the amplification apparatus. The second version of the shared signal may be exchanged with a component of the cable communication network that is located further away from the node/CMTS of the cable communication network than the amplification apparatus, e.g. a Tap being located further away from the CMTS than the amplification apparatus.

Figure 3C:
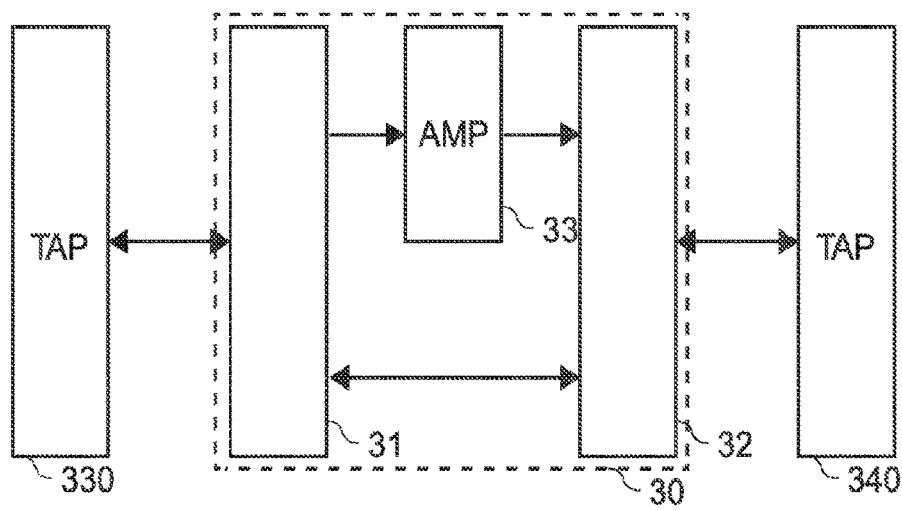
FIGS. 3c and 3d shows block diagram of examples of a cable communication network comprising an amplification apparatus or an amplification device.
Figure 3D:
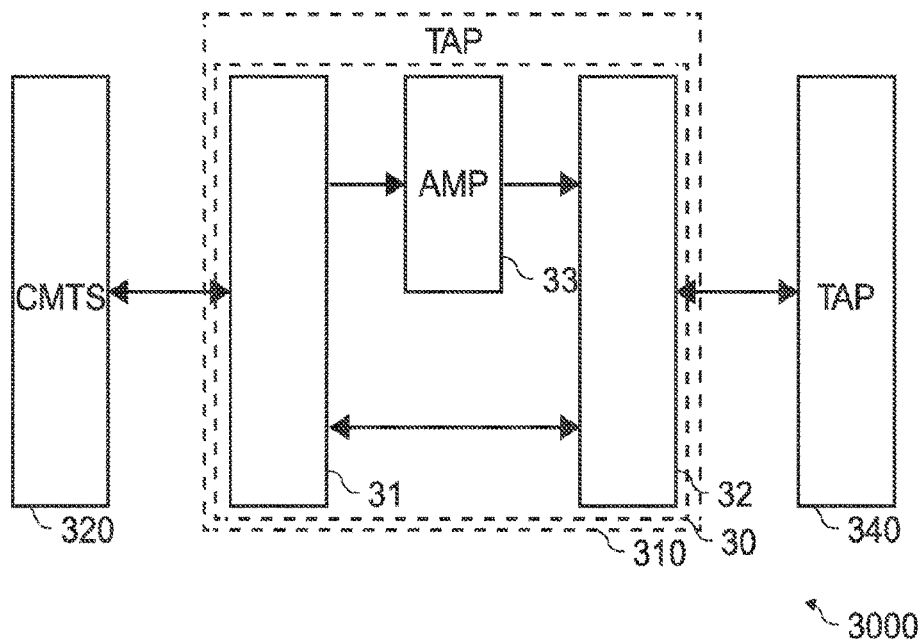

FIGS. 3c and 3d show two examples of cable communication network in which this is the case. FIGS. 3c and 3d shows block diagram of examples of a cable communication network 3000 comprising an amplification apparatus or an amplification device 30. For example, the cable communication network may be based on the DOCSIS, e.g. based on DOCSIS 4.0 or later. The cable communication network 3000 comprises at least a first component 320; 330, a second component 340 and the amplification apparatus or device 30. The amplification apparatus comprises interface circuitry or interfacing means 31; 32 for exchanging a first version of a shared signal with the first component of the cable communication network and for exchanging a second version of the shared signal with the second component of the cable communication network. For example, the first component may be a tap 330 or a node, e.g. a cable modem termination system 320, of the cable communication network. The second component 340 may be a tap of the cable communication network.

In some examples, the amplification apparatus may be arranged between two taps 330; 340, as shown in FIG. 3c. Alternatively, the amplification apparatus may be integrated within a tap 310 of the cable communication network, e.g. as shown in FIG. 3d. In other words, a tap 310 of the cable communication network may comprise the amplification apparatus. FIG. 3d shows a tap 310 for a cable communication network 300, the tap 310 comprising the apparatus or device 30.

Examples of the present disclosure may be applied to so-called N+0 cable communication networks, where no amplifier is placed between the Node (e.g. CMTS) and the respective Taps (and the amplification apparatus), and to N+X cable communication networks, where one or more amplifiers are placed between the Node and the respective Taps (and the amplification apparatus). In N+0 networks, FDX is supported. For example, the cable communication network may be a cable communication network that comprises FDX functionality (in case of N+0 network), or a cable communication network without FDX functionality.

More details and aspects of the amplification apparatus or device, and of the cable communication network are mentioned in connection with the proposed concept or one or more examples described above or below (e.g. FIG. 1a to 2, 4 to 6f). The amplification apparatus or device, and of the cable communication network may comprise one or more additional optional features corresponding to one or more aspects of the proposed concept or one or more examples described above or below.

Figure 4:
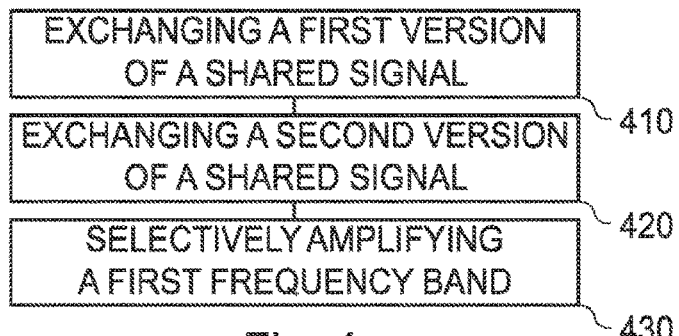
FIG. 4 shows a flow chart of an example of an amplification method for a Tap of a cable communication network.

FIG. 4 shows a flow chart of an example of an amplification method for a Tap of a cable communication network. The method may also be suitable for other types of devices, e.g. for a stand-alone amplification apparatus or device that is separate from a Tap. The method comprises exchanging 410, via interface circuitry, a first version of a shared signal with a first component of the cable communication network. The shared signal is based on a frequency spectrum comprising at least a first frequency band and a second frequency band. The method comprises exchanging 420, via interface circuitry, a second version of the shared signal with a second component of the cable communication network. The method comprises selectively amplifying 430, via amplifier circuitry, the first frequency band of the frequency spectrum of the shared signal, such that the first frequency band is amplified in the second version of the shared signal.

Features described in connection with the amplification apparatus or device of FIGS. 3a to 3b, and/or with the cable communication network of FIGS. 3c to 3d, may likewise be applied to the amplification method of FIG. 4.

More details and aspects of the amplification method are mentioned in connection with the proposed concept or one or more examples described above or below (e.g. FIG. 1a to 3d, 5a to 6f). The amplification method may comprise one or more additional optional features corresponding to one or more aspects of the proposed concept or one or more examples described above or below.

Figure 5A:
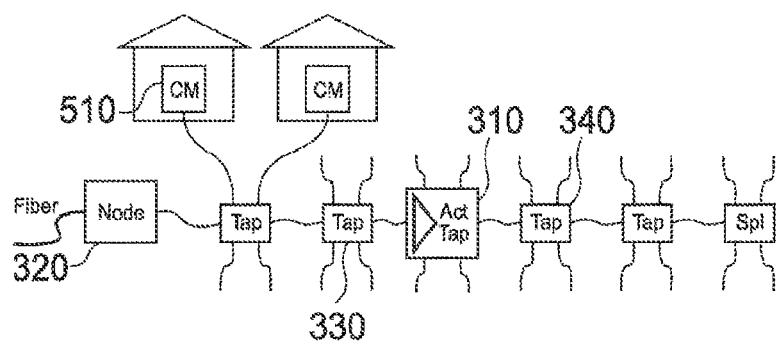
FIG. 5a shows a schematic diagram of a cable communication network comprising an amplifier.

As has been introduced in connection with FIGS. 3a to 4, examples of the present disclosure may use a reduced complexity and therefore a lower-cost Amplifier to 'decimate' the N+0 network. The amplifier can be co-located with Tap 3 310 (i.e. Tap 140 of FIG. 1) for the network example given in FIG. 1, as shown in FIG. 5*a*. FIG. 5*a* further shows a node 320, such as a CMTS, a preceding Tap 330 and a subsequent Tap 340. Cable modems 510 are connected to the Taps. FIG. 5*a* shows a schematic diagram of a cable communication network comprising an amplifier. FIG. 5*a* may show how to 'Decimate' an N+0 network with additional Amp station.

The new amplifier might only amplify the extended part of the DOCSIS spectrum, leading to reduced complexity, power consumption and cost. Hence, this Amp may be referred to as an Extended Spectrum Amplifier (ESA), which may be the amplifier apparatus or device 30 of FIG. 3*a*. For example, a diplexer may be used to separate the extended spectrum for amplification at the ESA. Examples of the present disclosure may be aimed at reducing the guard band required for Diplexer (guard band is wasted spectrum).

Figure 5B:
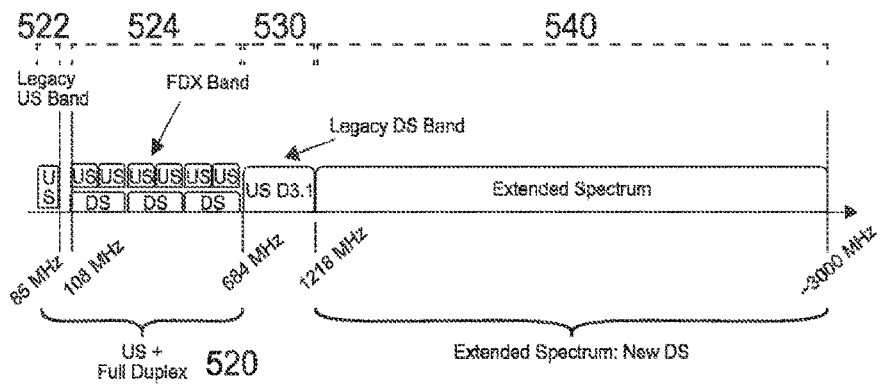
FIG. 5b shows a frequency plan comprising an extended spectrum.

FIG. 5*b* shows a frequency plan comprising an extended spectrum, e.g. for extending cable spectrum to 3 GHz according to an example. The spectrum comprises a portion 522 below 85 MHz that is used as a legacy upstream (US) band, a gap between 85 MHz and 108 MHz, and an FDX band 524 between 108 MHz and 684 MHz, which comprises bands that can be used for upstream or downstream (DS). The legacy US band 522 and the FDX band 524 from an US and Full Duplex band 520. The spectrum further comprises a legacy DS band 530 between 684 and 1218 MHz, and an Extended Spectrum band 540 between 1218 MHz and ~3 GHz, which may be used as "new" downstream band.

In the following, 1.8 GHz DOCSIS may be used as an example. Assume the new spectrum 540 beyond 1.2 GHz are all downstream (DS). Spectrum between 108-684 MHz (e.g. the second frequency band) is the FDX band 524 of DOCSIS 4.0 and the ESA amp may maintain passive network for this band for FDX operation. The ESA may amplify the spectrum from 684 MHz to 1.8 GHz (bands 530 and 540 in FIG. 5*b*, e.g. the first frequency band). If the new ESA is co-located at one of the Taps, it may potentially be powered through Coax drop cable from the CPE. However, powering through the trunk cable is generally the preferred approach for the operators.

The amplifier according to various examples may be configured to amplify the spectrum from 684 MHz to 1.8 GHz while not interfering with the signal below the 684 MHz spectrum. In doing so, no guard band may be required between the spectrum handled by ESA and the rest of the spectrum.

N+0 may be maintained for spectrum below 684 MHz, which may enable DOC SIS FDX. This may yield full backward compatibility, including FDX capability.

The amplifier needed for amplifying the extended spectrum, 684 MHz to 1.8 or 3 GHz, may have a high lower band edge compared to traditional network Amps, which had to amplify signal beyond ~10 s of MHz. This may offer a significant relaxation to Amplifier design, potentially allowing amplifier manufacturers to come up with cheaper and lower power devices. There might not be a need for a guard band between the signal amplified by ESA and the rest of the spectrum.

Cable channel losses increase monotonically with frequency, limiting the possibility of using spectrum beyond 1 GHz without losing significant capacity especially for the CMs far from the Node or Amps. Example may address this by reducing the spacing between Amplifiers in the HFC network. For example, in an N+0 network, this may be done by adding an amplifier station after mid tap (tap 3 or 4 in the example of FIG. 1). Conventional Amps amplify the entire spectrum. In various examples, taking advantage of cable channel attenuation properties, the specification for the required amplifier may be simplified by increasing the lower edge of amplified signal spectrum. In other words, the lower edge of the frequency band may be increased.

The choice of lower edge of this amplifier could be made based on operator requirements.
 a) To maintain FDX operation, the spectrum below 684 MHz may be left untouched.
 b) Operators may choose to select a higher than 684 MHz band edge based on other requirements related to legacy modems in their network.

Without loss of generality, the upper edge of spectrum passed though undisturbed by the ESA may be denoted as $f_{Ext}$, where $f_{Ext} \geq 684$ MHz to keep FDX band in N+0 network mode.

Figure 5C:
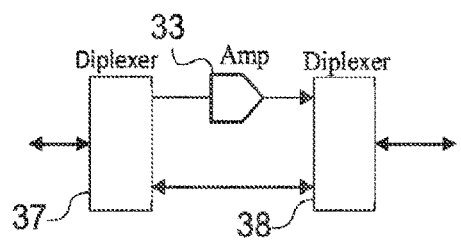
FIG. 5c shows a schematic diagram of an amplifier module for a downstream-only extended spectrum.

In some approaches, Diplexers may be used, which may require a Transition band of $\Delta f_{Ext}$. FIG. 5*c* shows a schematic diagram of an amplifier module for a downstream-only extended spectrum, e.g. of an Extended Spectrum Amplifier (ESA) Module for downstream only extended spectrum. In some approaches, the spectrum below $f_{Ext}$ may simply be passed though (lower arrow between Diplexers) keeping the network N+0 for these frequencies. Hence no impact on FDX operation. Signal above $f_{Ext} + \Delta f_{Ext}$ may be amplified in downstream direction.

In addition to amplifying, Amp could be potentially designed to compensate for any tilt in the signal spectrum due to frequency selective attenuation of cable channel. An implementation that is based on diplexers may make the transition band unusable.

Figure 5D:
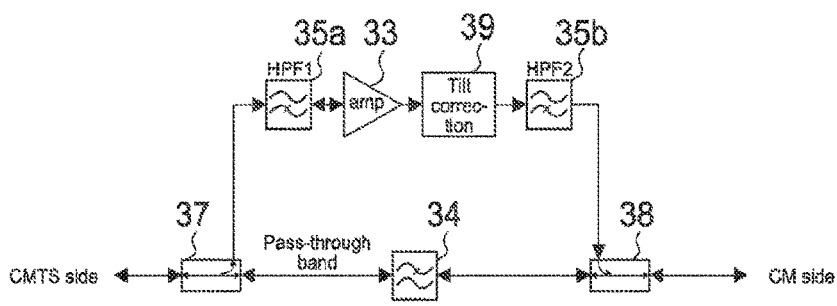
FIG. 5d shows a schematic diagram of an architecture of an amplifier for the extended spectrum.

Examples may provide an Amp design which eliminates the guard band between amplified spectrum and pass though spectrum. Examples may use couplers instead of diplexers, as shown in FIG. 5*d* below. FIG. 5*d* shows a schematic diagram of an architecture of an amplifier for the extended spectrum (ESA). The amplifier comprises two branches, a first branch and a second branch. The two branches are supplied by two couplers, a first coupler 37 which supplies the second branch and a second coupler 38 which merges the output of the second branch to the output of the first branch. The first branch comprises a low-pass filter 34 and transports the pass-through band bi-directionally. The second branch is fed by the branch-off of the first coupler, and comprises, sequentially in this order, a high-pass filter HPF1 35*a*, an amplifier 33, tilt correction/modification circuitry 39 and a further high-pass filter HPF2 35*b*, with the output of the further high-pass filter being fed into the second coupler 38. The second branch is unidirectional.

Despite 10 dB loss in the coupler before the Amp, good signal levels may be expected at Amp input given that signal levels at ESA may be expected to be more than 10 dB better than that of CMs connected to tap 2. Note Tap 2 has a value of 29 dB (see FIG. 1 130).

Generally, the transmit signal spectrum at Node (for N+0) may be up-tilted, so the power spectral density (PSD) of the signal received at CMs are close to flat. Basically, the up-tilt in signal spectrum counters the loss of Coax channel. In case of ESA, given that ESA is placed close to the halfway mark of the N+0 network range, the tilt at Node for the extended spectrum may be reduced to half the gradient in legacy spectrum. Hence, by the time the signal reaches the ESA input, it may have a half level tilt in legacy band and flat tilt at extended spectrum. An example of an input signal for the ESA is shown in FIG. 6*a*, assuming that the transmitted signal had a 12 dB tilt in the range up to 1 GHz, 6 dB tilt in the range above 1 GHz and a 3 dB negative step of the transmitted PSD at 1 GHz. FIG. 6a shows an example of an expected signal PSD (Power Spectral Density) at the Amp input (i.e. input signal) 600. In FIGS. 6a to 6f, the x-axis refers the frequency (in MHz), and the y-axis relates to dB (from reference). The x-axis covers the spectrum from 0 to 2 GHz.

The aim of the ESA is to boost the signal of extended spectrum and to introduce a half tilt (plus a bit more tilt to counter amp insertion losses), so that the CMs at the end of the line receive close to flat PSD with good absolute PSD level for the entire spectrum.

The following section illustrates how the signal level can be recovered for extended spectrum so that the CMs at the end of the line can be reached with close to flat power spectrum density (PSD).

The example quantitative analysis below uses a specific implementation and assumes some figures for coupling factor, frequency responses and insertion losses. These figures are mainly used to simplify the example but are assumed to be close to realistic. The same principles will apply to other implementations and other more accurate frequency responses.

Couplers (e.g. coupling circuitry 37; 38)
　Freq. range: DOCSIS frequencies used to transmit Downstream
　Insertion Loss (IL)=1 dB
　Coupling=10.5 dB
High-pass Filter (e.g. high-pass filters 35a; 35b)
　Stop-band up to 950 MHz, 42 dB rejection
　Pass-band starting from 1050 MHz, 2 dB IL.
　Slope between stop-band and pass-band approximated as constant (0.4 dB/MHz)
Amplifier (e.g. amplifier circuitry 33)
　Passband: 500-2500 MHz
　Gain in passband: 40 dB
　Gain below passband drops with frequency by 0.05 dB/MHz
　Gain in passband drops with frequency by 0.004 dB/MHz
Tilt correction (e.g. amplitude tilt modification circuitry 39)
　Applies frequency-dependent gain from −35 dB @ 0.1 GHz to −1 dB @ 1.8 GHz
Low-pass Filter (e.g. low-pass filter 34)
　Pass-band up to 1 GHz, 0.5 dB IL.
　Slope of 0.2 dB/MHz FIG. 6b shows the frequency response 610 of an exemplary implementation of HPF1 35a of FIG. 5d (as specified in the table above). FIG. 6c shows the frequency response 620 of an exemplary implementation of the amplifier 33 of FIG. 5d.

The signal at the ESA CMTS/Node-side input (to coupler 37) is passing in the direction of the CM with Insertion Loss (IL) of two couplers and with the LPF frequency response. The overall loss below 950 MHz in this example is 2 dB due to the couplers IL.

The signal at the input is also coupled to the high-band path (the second branch), with a 10 dB coupling factor. It is filtered by HPF1 35a, amplified (by amplifier 33), tilt-corrected (by tilt-correction/modification circuitry 39), filtered by HPF2 35b and combined with the pass-through signal using the second coupler 38.

FIG. 6d shows the signal at various points along the high-band path (i.e. the second branch), i.e. in the extended signal amplification path. FIG. 6d shows the coupled input signal 630, the signal 640 after HPF1, the signal 650 after the amplifier, the signal 660 after tilt correction/modification, and the injected amplified signal 670 (after HPF2 and the second coupler).

The input signal 630 has the form of the signal at the CMTS side input. After being filtered 640 the signal retains mostly the higher frequencies. The signal is then amplified 650, tilt-correction is applied 660 and filtered again. The high-band amplified signal 670 that is eventually added to the pass-through signal is shown in the graph as the "injected amplified signal". The areas of interest may be around the 1 GHz area, with performance at lower frequencies targeting to have no significant impact on the signals lower than 1 GHz.

FIG. 6e shows the pass-through low-pass-filtered signal 680 and the high-band amplified and filtered signal 670. FIG. 6e further shows a combined signal 690 that results from combining the pass-through low-pass-filtered signal 680 and the high-band amplified and filtered signal 670. The signals around 1 GHz frequency have opposite slopes, reducing the range where their power is close, to reduce the range where the signal would have a "multipath"-like effect. In most of the frequency range, the signal power is dominated by either the non-amplified through signal or the amplified ES signal.

Figure 6F:
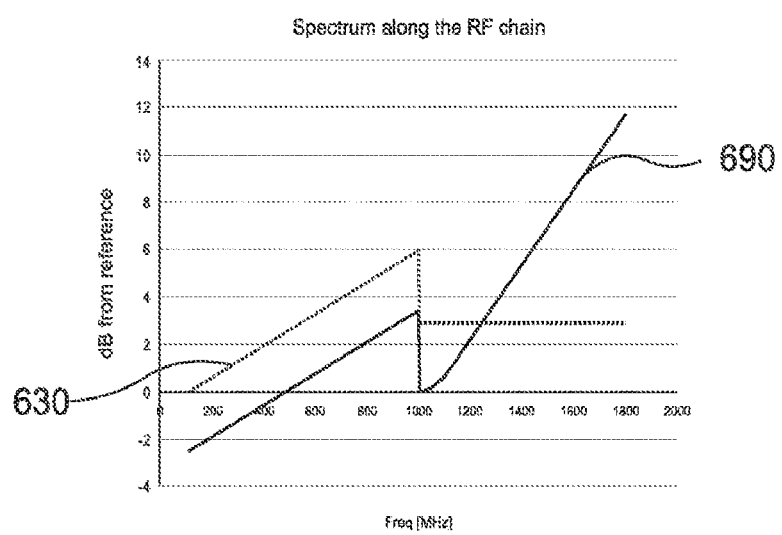
FIG. 6f shows an input signal and a resulting combined output signal.

FIG. 6f shows the input signal 630 vs. the resulting combined output signal 690. In the range below 1 GHz, the output has some loss relative to the input due to couplers and LPF. Above 1 GHz, the output signal with frequency has greater contribution of the amplified signal and its power is increasing over frequency. Such signal can incur additional down-tilt from the plant, while without the suggested ES Amplifier such tilt could otherwise significantly reduce performance or even make some of the higher frequencies unusable.

The aspects and features mentioned and described together with one or more of the previously detailed examples and figures, may as well be combined with one or more of the other examples in order to replace a like feature of the other example or in order to additionally introduce the feature to the other example.

Example 1 relates to an amplification apparatus (30) for a tap (310) of a cable communication network (3000), the amplification apparatus comprising interface circuitry (31) for exchanging a first version of a shared signal with a first component of the cable communication network, wherein the shared signal is based on a frequency spectrum comprising at least a first frequency band and a second frequency band, and interface circuitry (32) for exchanging a second version of the shared signal with a second component of the cable communication network. The amplification apparatus (30) comprises amplifier circuitry (33) configured to selectively amplify the first frequency band of the frequency spectrum of the shared signal, such that the first frequency band is amplified in the second version of the shared signal.

In Example 2, the subject matter of example 1 or any of the Examples described herein may further include, that the first frequency band comprises higher frequencies than the second frequency band.

In Example 3, the subject matter of one of the examples 1 to 2 or any of the Examples described herein may further include, that the first frequency band and the second frequency are adjacent within the frequency spectrum.

In Example 4, the subject matter of example 3 or any of the Examples described herein may further include, that the first frequency band and at least a portion of the second frequency band being adjacent to the first frequency band are used for downstream communication within the cable communication network.

In Example 5, the subject matter of one of the examples 1 to 4 or any of the Examples described herein may further include, that the second frequency band comprises at least a first portion and a second portion, the first portion being used for downstream communication within the cable communication network and the second portion being used for upstream communication and/or full duplex communication within the cable communication network, the first portion being adjacent to the first frequency band.

In Example 6, the subject matter of one of the examples 1 to 5 or any of the Examples described herein may further include a low-pass filter (34) and at least one high-pass filter (35*a*; 35*b*), wherein the low-pass filter is configured to at least partially block the first frequency band, and wherein the at least one high-pass filter is configured at least partially block the second frequency band.

In Example 7, the subject matter of example 6 or any of the Examples described herein may further include, that filter characteristics of the low-pass filter and of the at least one highpass filter of the amplification apparatus are chosen such, that, within a transition frequency band partially overlapping the first and the second frequency band, a shift in a frequency response of the low-pass filter occurs in an opposite direction to a shift in a frequency response of the at least one high-pass filter.

In Example 8, the subject matter of one of the examples 6 to 7 or any of the Examples described herein may further include control circuitry (36), wherein the low-pass filter is an adjustable or switchable low-pass filter and the at least one high-pass filter is at least one adjustable or switchable high-pass filter, wherein the control circuitry is configured to adjust the filter characteristics of the low-pass filter and of the at least one high-pass filter, thereby shifting the boundary between the first and the second frequency band.

In Example 9, the subject matter of one of the examples 1 to 8 or any of the Examples described herein may further include first coupling circuitry (37) and second coupling circuitry (38), the first coupling circuitry being configured to provide the first version of the shared signal to the amplifier circuitry, the second coupling circuitry being configured to insert the output of the amplifier circuitry into the second version of the shared signal.

In Example 10, the subject matter of example 9 or any of the Examples described herein may further include a first high-pass filter (35*a*) being configured to high-pass-filter the first version of the shared signal that is provided to the amplifier circuitry by the first coupling circuitry.

In Example 11, the subject matter of one of the examples 9 to 10 or any of the Examples described herein may further include a second high-pass filter (35*b*) being configured to highpass-filter the output of the amplifier circuitry and to provide the high-pass filtered output to the second coupling circuitry.

In Example 12, the subject matter of one of the examples 9 to 11 or any of the Examples described herein may further include, that the first coupling circuitry and the second coupling circuitry are further configured to exchange a passthrough signal, the passthrough signal bypassing the amplifier circuitry.

In Example 13, the subject matter of example 12 or any of the Examples described herein may further include a low-pass filter (34) configured to low-pass filter the passthrough signal.

In Example 14, the subject matter of one of the examples 1 to 13 or any of the Examples described herein may further include amplitude tilt modification circuitry (39) configured to selectively adjust an amplitude of the output of the amplifier circuitry across at least the first frequency band.

In Example 15, the subject matter of one of the examples 1 to 14 or any of the Examples described herein may further include, that the first component is located upstream and the second component is located downstream from the amplification apparatus.

Example 16 relates to a tap (310) for a cable communication network (3000), the tap (310) comprising the amplification apparatus (30) according to one of the examples 1 to 15.

Example 17 relates to a cable communication network (3000) comprising at least a first component (320; 330). The cable communication network (3000) comprises a second component (340) and the amplification apparatus (30) according to one of the examples 1 to 16, the amplification apparatus comprising interface circuitry (31; 32) for exchanging a first version of a shared signal with the first component of the cable communication network and for exchanging a second version of the shared signal with the second component of the cable communication network.

In Example 18, the subject matter of example 17 or any of the Examples described herein may further include, that the second component (340) is a tap of the cable communication network.

In Example 19, the subject matter of one of the examples 17 to 18 or any of the Examples described herein may further include, that the first component is a tap (330) or a cable modem termination system (320) of the cable communication network.

In Example 20, the subject matter of one of the examples 17 to 19 or any of the Examples described herein may further include, that a tap (310) of the cable communication network comprises the amplification apparatus.

Example 21 relates to an amplification device (30) for a tap (310) of a cable communication network (3000), the amplification device comprising interfacing means (31) for exchanging a first version of a shared signal with a first component of the cable communication network, wherein the shared signal is based on a frequency spectrum comprising at least a first frequency band and a second frequency band, and interfacing means (32) for exchanging a second version of the shared signal with a second component of the cable communication network. The amplification device (30) comprises means for amplifying (33) configured to selectively amplify the first frequency band of the frequency spectrum of the shared signal, such that the first frequency band is amplified in the second version of the shared signal.

In Example 22, the subject matter of example 21 or any of the Examples described herein may further include, that the first frequency band comprises higher frequencies than the second frequency band.

In Example 23, the subject matter of one of the examples 21 to 22 or any of the Examples described herein may further include, that the first frequency band and the second frequency are adjacent within the frequency spectrum.

In Example 24, the subject matter of example 23 or any of the Examples described herein may further include, that the first frequency band and at least a portion of the second frequency band being adjacent to the first frequency band are used for downstream communication within the cable communication network.

In Example 25, the subject matter of one of the examples 21 to 24 or any of the Examples described herein may further include, that the second frequency band comprises at least a first portion and a second portion, the first portion being used for downstream communication within the cable communication network and the second portion being used for upstream communication and/or full duplex communication within the cable communication network, the first portion being adjacent to the first frequency band.

In Example 26, the subject matter of one of the examples 21 to 25 or any of the Examples described herein may further include low-pass filtering means (34) and at least one high-pass filtering means (35a; 35b), wherein the low-pass filtering means is configured to at least partially block the first frequency band, and wherein the at least one high-pass filtering means is configured at least partially block the second frequency band.

In Example 27, the subject matter of example 26 or any of the Examples described herein may further include, that filter characteristics of the low-pass filtering means and of the at least one high-pass filtering means of the amplification device are chosen such, that, within a transition frequency band partially overlapping the first and the second frequency band, a shift in a frequency response of the low-pass filtering means occurs in an opposite direction to a shift in a frequency response of the at least one high-pass filtering means.

In Example 28, the subject matter of one of the examples 21 to 27 or any of the Examples described herein may further include means for controlling (36), wherein the low-pass filtering means is an adjustable or switchable low-pass filtering means and the at least one high-pass filtering means is at least one adjustable or switchable high-pass filtering means, wherein the means for controlling is configured to adjust the filter characteristics of the low-pass filtering means and of the at least one high-pass filtering means, thereby shifting the boundary between the first and the second frequency band.

In Example 29, the subject matter of one of the examples 21 to 28 or any of the Examples described herein may further include first coupling means (37) and second coupling means (38), the first coupling means being configured to provide the first version of the shared signal to the means for amplifying, the second coupling means being configured to insert the output of the means for amplifying into the second version of the shared signal.

In Example 30, the subject matter of example 29 or any of the Examples described herein may further include first high-pass filtering means (35a) being configured to high-pass-filter the first version of the shared signal that is provided to the means for amplifying by the first coupling means.

In Example 31, the subject matter of one of the examples 29 to 30 or any of the Examples described herein may further include second high-pass filtering means (35b) being configured to high-pass-filter the output of the means for amplifying and to provide the high-pass filtered output to the second coupling means.

In Example 32, the subject matter of one of the examples 29 to 31 or any of the Examples described herein may further include, that the first coupling means and the second coupling means are further configured to exchange a passthrough signal, the passthrough signal bypassing the means for amplifying.

In Example 33, the subject matter of example 32 or any of the Examples described herein may further include a low-pass filtering means (34) configured to low-pass filter the passthrough signal.

In Example 34, the subject matter of one of the examples 21 to 33 or any of the Examples described herein may further include amplitude tilt modification means (39) configured to selectively adjust an amplitude of the output of the means for amplifying across at least the first frequency band.

In Example 35, the subject matter of one of the examples 21 to 34 or any of the Examples described herein may further include, that the first component is located upstream and the second component is located downstream from the amplification device.

Example 36 relates to a tap (310) for a cable communication network (3000), the tap (310) comprising the amplification device (30) according to one of the examples 21 to 35.

Example 37 relates to a cable communication network (3000) comprising at least a first component (320; 330), a second component (340) and the amplification device (30) according to one of the examples 21 to 36, the amplification device comprising interfacing means (31; 32) for exchanging a first version of a shared signal with the first component of the cable communication network and for exchanging a second version of the shared signal with the second component of the cable communication network.

In Example 38, the subject matter of example 37 or any of the Examples described herein may further include, that the second component (340) is a tap of the cable communication network.

In Example 39, the subject matter of one of the examples 37 to 38 or any of the Examples described herein may further include, that the first component is a tap (330) or a cable modem termination system (320) of the cable communication network.

In Example 40, the subject matter of one of the examples 37 to 39 or any of the Examples described herein may further include, that a tap (310) of the cable communication network comprises the amplification device.

Example 41 relates to an amplification method for a tap of a cable communication network, the amplification method comprising exchanging (410), via interface circuitry, a first version of a shared signal with a first component of the cable communication network, wherein the shared signal is based on a frequency spectrum comprising at least a first frequency band and a second frequency band, and exchanging (420), via interface circuitry, a second version of the shared signal with a second component of the cable communication network. The amplification method comprises selectively amplifying (430), via amplifier circuitry, the first frequency band of the frequency spectrum of the shared signal, such that the first frequency band is amplified in the second version of the shared signal.

In Example 42, the subject matter of example 41 or any of the Examples described herein may further include, that the first frequency band comprises higher frequencies than the second frequency band.

In Example 43, the subject matter of one of the examples 41 to 42 or any of the Examples described herein may further include, that the first frequency band and the second frequency are adjacent within the frequency spectrum.

In Example 44, the subject matter of example 43 or any of the Examples described herein may further include, that the first frequency band and at least a portion of the second frequency band being adjacent to the first frequency band are used for downstream communication within the cable communication network.

In Example 45, the subject matter of one of the examples 41 to 44 or any of the Examples described herein may further include, that the second frequency band comprises at least a first portion and a second portion, the first portion being used for downstream communication within the cable communication network and the second portion being used for upstream communication and/or full duplex communication within the cable communication network, the first portion being adjacent to the first frequency band.

In Example 46, the subject matter of one of the examples 41 to 45 or any of the Examples described herein may further include at least partially blocking the first frequency band using a low-pass filter, at least partially blocking the second frequency band using at least one highpass filter.

In Example 47, the subject matter of example 46 or any of the Examples described herein may further include, that filter characteristics of the low-pass filter and of the at least one high-pass filter are chosen such, that, within a transition frequency band partially overlapping the first and the second frequency band, a shift in a frequency response of the low-pass filter occurs in an opposite direction to a shift in a frequency response of the at least one high-pass filter.

In Example 48, the subject matter of one of the examples 41 to 47 or any of the Examples described herein may further include, that the low-pass filter is an adjustable or switchable low-pass filter and the at least one high-pass filter is at least one adjustable or switchable high-pass filter, wherein the method comprises adjusting the filter characteristics of the low-pass filter and of the at least one high-pass filter, thereby shifting the boundary between the first and the second frequency band.

In Example 49, the subject matter of one of the examples 41 to 48 or any of the Examples described herein may further include providing, using first coupling circuitry, the first version of the shared signal to the amplifier circuitry, and inserting, using the second coupled circuitry, the output of the amplifier circuitry into the second version of the shared signal.

In Example 50, the subject matter of example 49 or any of the Examples described herein may further include, that high-pass-filtering, using a first high-pass filter, the first version of the shared signal that is provided to the amplifier circuitry by the first coupling circuitry.

In Example 51, the subject matter of one of the examples 49 to 50 or any of the Examples described herein may further include high-pass-filtering, using a second high-pass filter, the output of the amplifier circuitry and providing the high-pass filtered output to the second coupling circuitry.

In Example 52, the subject matter of one of the examples 49 to 51 or any of the Examples described herein may further include exchanging a passthrough signal between the first coupling circuitry and the second coupling circuitry, the passthrough signal bypassing the amplifier circuitry.

In Example 53, the subject matter of example 52 or any of the Examples described herein may further include low-pass filtering, using a low-pass filter, the passthrough signal.

In Example 54, the subject matter of one of the examples 41 to 53 or any of the Examples described herein may further include selectively adjusting, using an amplitude tilt modification circuitry, an amplitude of the output of the amplifier circuitry across at least the first frequency band.

In Example 55, the subject matter of one of the examples 41 to 54 or any of the Examples described herein may further include, that the first component is located upstream and the second component is located downstream from the amplification circuitry.

Example 56 relates to a tap for a cable communication network, the tap being configured to perform the method according to one of the examples 41 to 55.

Example 57 relates to a cable communication network comprising at least a first component, a second component and a component configured to perform the amplification method according to one of the examples 41 to 56, the amplification method comprising exchanging a first version of a shared signal with the first component of the cable communication network and for exchanging a second version of the shared signal with the second component of the cable communication network.

In Example 58, the subject matter of example 57 or any of the Examples described herein may further include, that the second component is a tap of the cable communication network.

In Example 59, the subject matter of one of the examples 57 to 58 or any of the Examples described herein may further include, that the first component is a tap or a cable modem termination system of the cable communication network.

In Example 60, the subject matter of one of the examples 57 to 59 or any of the Examples described herein may further include, that a tap of the cable communication network is configured to perform the amplification method.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An amplification apparatus for a tap of a cable communication network, the amplification apparatus comprising:
   interface circuitry for exchanging a first version of a shared signal with a first component of the cable communication network, wherein the shared signal is based on a frequency spectrum comprising at least a first frequency band and a second frequency band,
   interface circuitry for exchanging a second version of the shared signal with a second component of the cable communication network;
   amplifier circuitry configured to selectively amplify the first frequency band of the frequency spectrum of the shared signal, such that the first frequency band is amplified in the second version of the shared signal; and
   a low-pass filter and at least one high-pass filter, wherein the low-pass filter is configured to at least partially block the first frequency band, and wherein the at least one high-pass filter is configured at least partially block the second frequency band,
   wherein filter characteristics of the low-pass filter and of the at least one high-pass filter of the amplification apparatus are chosen such that, within a transition frequency band partially overlapping the first and the second frequency band, a shift in a frequency response of the low-pass filter occurs in an opposite direction to a shift in a frequency response of the at least one high-pass filter.

2. The amplification apparatus according to claim 1, wherein the first frequency band comprises higher frequencies than the second frequency band.

3. The amplification apparatus according to claim 1, wherein the first frequency band and the second frequency band are adjacent within the frequency spectrum.

4. The amplification apparatus according to claim 3, wherein the first frequency band and at least a portion of the second frequency band being adjacent to the first frequency band are used for downstream communication within the cable communication network.

5. The amplification apparatus according to claim 1, wherein the second frequency band comprises at least a first portion and a second portion, the first portion being used for downstream communication within the cable communication network and the second portion being used for upstream communication and/or full duplex communication within the cable communication network, the first portion being adjacent to the first frequency band.

6. The amplification apparatus according to claim 1, comprising control circuitry, wherein the low-pass filter is an adjustable or switchable low-pass filter and the at least one high-pass filter is at least one adjustable or switchable high-pass filter, wherein the control circuitry is configured to adjust the filter characteristics of the low-pass filter and of the at least one high-pass filter, thereby shifting the boundary between the first and the second frequency band.

7. The amplification apparatus according to claim 1, comprising first coupling circuitry and second coupling circuitry, the first coupling circuitry being configured to provide the first version of the shared signal to the amplifier circuitry, the second coupling circuitry being configured to insert the output of the amplifier circuitry into the second version of the shared signal.

8. The amplification apparatus according to claim 7, comprising a first high-pass filter being configured to high-pass-filter the first version of the shared signal that is provided to the amplifier circuitry by the first coupling circuitry.

9. The amplification apparatus according to claim 7, comprising a second high-pass filter being configured to high-pass-filter the output of the amplifier circuitry and to provide the high-pass filtered output to the second coupling circuitry.

10. The amplification apparatus according to claim 7, wherein the first coupling circuitry and the second coupling circuitry are further configured to exchange a passthrough signal, the passthrough signal bypassing the amplifier circuitry.

11. The amplification apparatus according to claim 10, comprising a low-pass filter configured to low-pass filter the passthrough signal.

12. The amplification apparatus according to claim 1, comprising amplitude tilt modification circuitry configured to selectively adjust an amplitude of the output of the amplifier circuitry across at least the first frequency band.

13. The amplification apparatus according to claim 1, wherein the first component is located upstream and the second component is located downstream from the amplification apparatus.

14. A tap for a cable communication network, the tap comprising the amplification apparatus according to claim 1.

15. A cable communication network comprising at least a first component, a second component and the amplification apparatus according to claim 1, the amplification apparatus comprising interface circuitry for exchanging a first version of a shared signal with the first component of the cable communication network and for exchanging a second version of the shared signal with the second component of the cable communication network.

16. The cable communication network according to claim 15, wherein the second component is a tap of the cable communication network.

17. The cable communication network according to claim 15, wherein the first component is a tap or a cable modem termination system of the cable communication network.

18. The cable communication network according to claim 15, wherein a tap of the cable communication network comprises the amplification apparatus.

19. An amplification method for a tap of a cable communication network, the amplification method comprising:
  exchanging, via interface circuitry, a first version of a shared signal with a first component of the cable communication network, wherein the shared signal is based on a frequency spectrum comprising at least a first frequency band and a second frequency band,
  exchanging, via interface circuitry, a second version of the shared signal with a second component of the cable communication network; and
  selectively amplifying, via amplifier circuitry, the first frequency band of the frequency spectrum of the shared signal, such that the first frequency band is amplified in the second version of the shared signal,
  wherein the first frequency band is at least partially blocked by a low-pass filter and the second frequency band is at least partially blocked by at least one high-pass filter,
  wherein filter characteristics of the low-pass filter and of the at least one high-pass filter are chosen such that, within a transition frequency band partially overlapping the first and the second frequency band, a shift in a frequency response of the low-pass filter occurs in an opposite direction to a shift in a frequency response of the at least one high-pass filter.

20. A tap for a cable communication network, the tap being configured to perform the method according to claim 19.

21. A cable communication network comprising at least a first component, a second component and a component configured to perform the amplification method according to claim 19, the amplification method comprising exchanging a first version of a shared signal with the first component of the cable communication network and for exchanging a second version of the shared signal with the second component of the cable communication network.

* * * * *